Figure 1:
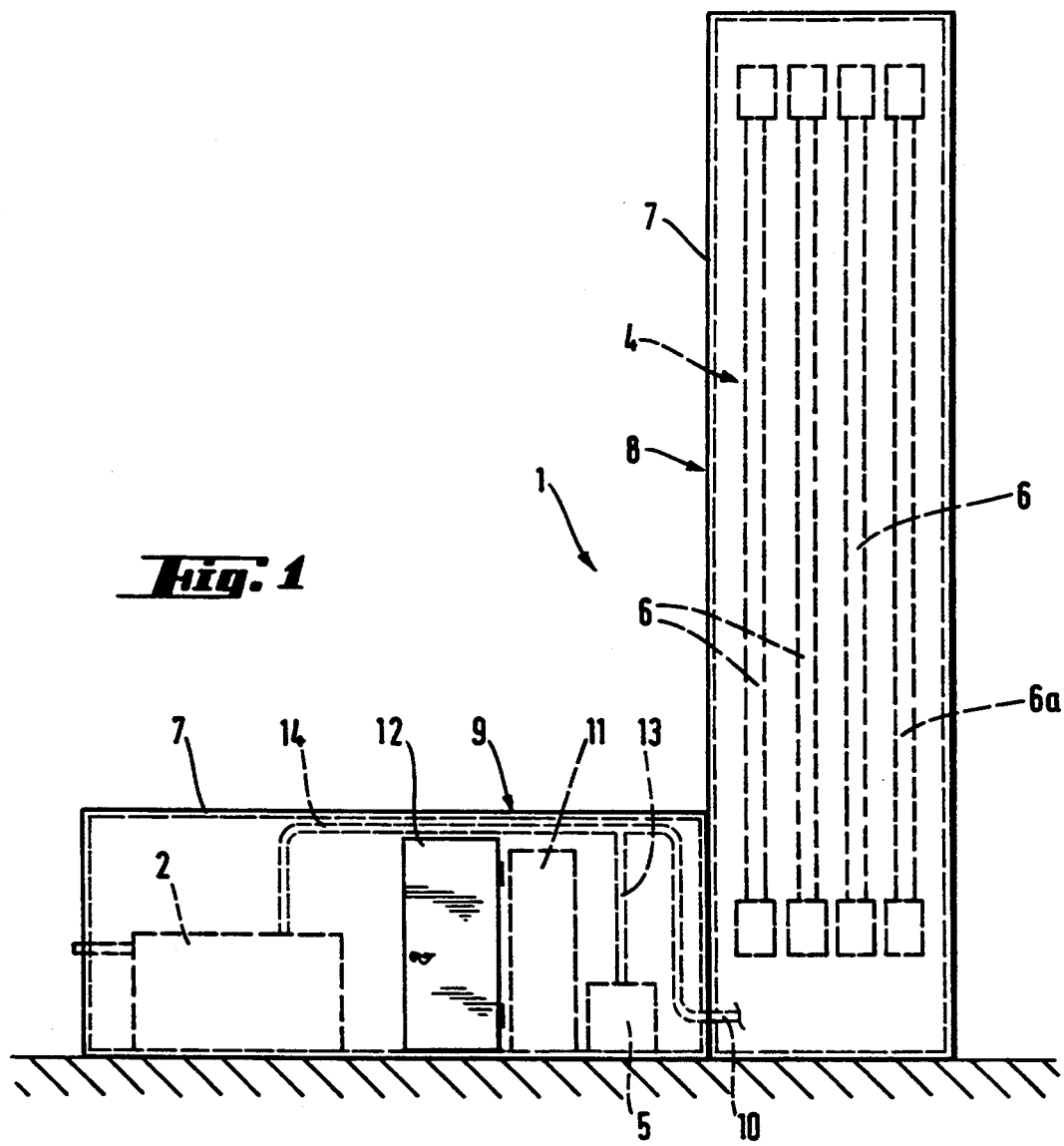

United States Patent
Voigt et al.

[11] Patent Number: 5,417,937
[45] Date of Patent: May 23, 1995

[54] APPARATUS FOR WET OXIDATION

[75] Inventors: Joachim Voigt, Efringen-Kirchen, Germany; Rudolf Büttiker, Riehen; Rolf Strub, Jongny, both of Switzerland

[73] Assignee: Ciba-Geigy Corporation, Ardsley, N.Y.

[21] Appl. No.: 709,675

[22] Filed: Jun. 3, 1991

[30] Foreign Application Priority Data

Jun. 8, 1990 [CH] Switzerland ............ 1932/90

[51] Int. Cl.$^6$ ............................................. B01J 8/00
[52] U.S. Cl. ............................... 422/189; 210/93; 210/149; 210/175; 210/181; 210/241; 210/761; 422/199; 422/201
[58] Field of Search ............... 422/130, 189, 199, 201; 210/149, 761, 181, 175, 93, 241

[56] References Cited

U.S. PATENT DOCUMENTS

| | | | |
|---|---|---|---|
| 3,300,402 | 1/1967 | Grich et al. | 422/189 |
| 3,630,365 | 12/1971 | Woodbridge et al. | 210/241 |
| 3,856,672 | 12/1974 | Boswinkle et al. | 210/181 |
| 4,139,461 | 2/1979 | Bauer | 210/761 |
| 4,383,920 | 5/1983 | Muller et al. | 210/87 |
| 4,530,702 | 7/1985 | Fetters et al. | 48/209 |
| 4,659,460 | 4/1987 | Muller et al. | 210/93 |
| 4,680,008 | 8/1987 | Gibson | 202/118 |
| 4,877,519 | 10/1989 | Robey | 210/149 |
| 4,925,571 | 5/1990 | Jacob et al. | 210/742 |

FOREIGN PATENT DOCUMENTS 899229 1/1990 Germany.

OTHER PUBLICATIONS

Zimpro Inc. Publication: "Reactor", No. 58 (Oct. 1986).
Zimpro Inc. Publication: "Reactor", No. 65 (May 1989).
Helmut Perkow et al, Chem.-Ing.-Tech., 52(1980) No. 12, pp. 943-951.
SRI Report No. 187 by Ma et al., Dec., 1986 pp. 171-185.

*Primary Examiner*—W. Gary Jones
*Assistant Examiner*—Laura E. Edwards
*Attorney, Agent, or Firm*—Kevin T. Mansfield

[57] ABSTRACT

The apparatus (1) for wet oxidation is pre-assembled with its individual units, namely a high-pressure pump (2), a heat exchanger (3), a reactor (4) for the actual wet oxidation and a compressor (5) for feeding an oxygen/gas mixture, in one or two supporting flames and is accommodated in such a manner that its dimensions and its overall weight allow it to be transported on a road and/or rail vehicle, there advantageously being provided two such supporting flames in the form of standard containers (8 and 9), of which one may contain the reactor (4), divided into individual tube sections (6), and the heat exchanger (3), and the other may contain the remaining units, so that the entire apparatus can be pre-assembled into virtually operational condition and the two containers simply have to be set up, joined together and connected on site. Wet oxidation can thus be carried out even where relatively small quantities of medium are to be purified.

15 Claims, 2 Drawing Sheets

APPARATUS FOR WET OXIDATION

The invention relates to an apparatus for the wet oxidation especially of organically contaminated liquids and/or slurries, which has units which are connected to one another by means of pipes, namely at least one high-pressure pump for the medium to be purified, at least one heat exchanger in which unpurified medium and heated purified medium are conveyed in opposite directions, at least one further heat exchanger in which the purified medium is cooled to below 100° C., a reactor for the actual wet oxidation, and a compressor for feeding an oxygen/gas mixture, preferably air, to the reactor.

Such apparatuses for wet oxidation are known and various examples thereof are described in Chemie-Ingenieur-Technik 52 (1980) No. 12, pp. 943 to 951 in the article "Nass-oxidation—ein Beitrag zum Stand der Technik" [Wet oxidation—a contribution to the state of the art].

According to that article, such known apparatuses for wet oxidation are assembled from the individual units and the associated pipework, valves, control devices and the like at the site of use. This means that assembly costs are high and are worthwhile only where correspondingly large quantities of media for purification, such as waste water and slurries and the like, containing a wide variety of impurities are produced, for example in large chemical plants.

There are, however, a large number of relatively small plants in which contaminated liquids and/or slurries are produced in correspondingly small amounts, where it may be that the impurity that occurs is always of only one type and even then that impurity may arise only occasionally or intermittently, so that the expenditure for such an installation for wet oxidation is not worthwhile. This frequently has the result that the contaminated media are not disposed of at all.

The problem is, therefore, to provide an apparatus of the type mentioned at the beginning that can be used profitably even when only a relatively small amount of liquid for purification is produced or when that liquid is produced only occasionally, or by means of which such waste water, slurries or similar contaminated media that may be produced at different locations can be purified by wet oxidation without having to be transported to the apparatus.

The surprising solution to this apparently contradictory problem is essentially as follows: the reactor in the apparatus mentioned at the beginning is divided into individual sections, which are arranged next to one another and are connected hydraulically in series, and is pre-assembled with further units in at least one supporting frame, the dimensions of the supporting frame and the overall weight of the—pre-assembled or prefabricated—apparatus being so selected that the apparatus can be transported on a road and/or rail vehicle.

In this manner, it is therefore possible to prefabricate an apparatus, that is to say produce it in the factory, so that expensive assembly on site is unnecessary. The division of the reactor into individual sections and their arrangement next to one another, as well as the fact that the apparatus is fixed inside a transportable supporting frame, results in a compact apparatus of limited dimensions which not only can be transported from the factory to the operating site for its primary use, but also, if necessary, can be taken to different operating sites where media for purification are produced occasionally or intermittently. Because the reactor is divided into individual sections, the necessary overall length of the reactor for adequate wet oxidation is achieved in advantageous manner despite the dimensions of the apparatus being limited on account of its transportability.

It is especially advantageous for the supporting frame to have outer walls and to form a housing for the units contained therein. The units are thus protected and sheltered from the effects of the weather during transportation and when they are subsequently in use. In addition, the noise produced by the pump and the compressor can be muffled.

In an embodiment of the invention that is especially advantageous for inexpensive manufacture, the housing formed by the supporting frame and the outer walls is a standard container. It is then sufficient to acquire such a standard container of suitable dimensions and incorporate the units therein, and the entire apparatus is then already pre-assembled. Since standard containers have the necessary dimensions for transportation, the apparatus can then easily be transported to its operating site.

For an apparatus having a certain minimum capacity, it may be advantageous if at least two supporting frames, especially containers, are provided for accommodating the individual units and, in the operating position, the connecting pipes of the units of one container can be coupled to those of the other container. Although in such an embodiment two containers have to be equipped, transported and connected together on site, in that manner the individual units can better be accommodated and, if necessary, be made slightly larger, or, conversely, the two containers need not be of the maximum possible size.

In that case it is advantageous for one container to contain the pump and the compressor and, optionally, a control and operating console, and the other to contain the reactor, divided into individual sections, and preferably the heat exchangers. The reactor sections and the heat exchangers can be accommodated, for example, in the longitudinal direction of the largest dimension of such a container, so that the container can be placed on one of its small side faces, while another container can stand on one of its long sides and contains the pump and the compressor and, if appropriate, the control console, so that the apparatus as a whole is approximately L-shaped in the ready-for-use condition. This gives the best possible use of space on the one hand for the apparatus itself and on the other hand within the apparatus. In this manner, a sufficiently high throughput of medium to be purified can be achieved.

The pressure line of the compressor can open into the pressure line of the high-pressure pump. As a result, only one complete pipeline has to lead to the reactor, that is to say only one corresponding pipe coupling needs to be provided between two containers and assembled when the apparatus is set up.

In order to achieve a sufficient reactor length within the limited dimensions of a transportable frame or housing, it is advantageous for the reactor to be divided into at least three or four preferably tubular sections which are connected hydraulically in series and are arranged approximately parallel to one another. Depending upon the desired degree of purification, more such tube sections could also be provided.

For reasons of manufacture and assembly it may be advantageous for the sections or tube sections forming the reactor to have identical diameters and/or cross-sections.

However, in order to improve the mixing of the already hot medium with the incoming medium, it is also possible for the tubular section of the reactor that is located first in the direction of flow to have a larger cross-section than the subsequent tube sections, since an approximately toroidal flow can then form inside the first tube section, which brings about the desired mixing.

The heat exchanger is advantageously formed by single-tube heat exchangers which are arranged geometrically next to one another and are connected hydraulically in series, the incoming medium preferably flowing through the inner tube and the purified, hot outgoing medium preferably flowing through the casing surrounding the inner tube. In practice, therefore, the heat exchanger is likewise divided into individual heat exchangers a sufficient number of which can be accommodated next to one another, adjacent to the reactor tube sections, in a very compact manner, on the small base area of a vertically arranged container.

As already mentioned, before entering the heat exchanger the pressure line for the oxygen/gas mixture must open into the pressure line for the medium to be purified so that the two media are mixed before they flow through the heat exchanger.

Each of the individual single-tube heat exchangers may have an overall length that corresponds approximately to the length of the individual tube sections of the reactor or is only slightly greater than or slightly less than that length. Accordingly, in the operating position the individual tube sections of the reactor and the single-tube heat exchangers can be arranged upright and parallel to one another on a relatively small base area, so that a high capacity can be achieved in a small space. In the case of counterflow heat exchangers, a correspondingly high heat exchanger efficiency is achieved.

Downstream of the heat exchanger for the medium there may be arranged a second heat exchanger which serves to heat, for example, industrial water or the like. It is to be assumed that the heat exchanger that serves to preheat the medium to be purified leaves behind in the purified medium an amount of heat that may be sufficient to heat industrial water, so that the apparatus, although designed primarily with a view to pre-assembly, can be arranged also for the economic utilisation of energy.

The heat exchanger for preheating the medium to be purified may have a valve-controlled bypass line that bypasses the heat exchanger, and there may be provided in or on the reactor at least one heat sensor for actuating or regulating the bypass valve. The heat produced during the wet oxidation is, therefore, first utilised in the heat exchanger or exchangers to bring the incoming contaminated medium up to reaction temperature as far as possible. If, however, more oxidation heat is produced in the reactor than is needed to preheat the contaminated medium, the problem arises of conveying that heat away without the expenditure in terms of equipment, and hence also the space requirement, being increased as a result. This can be achieved in simple manner with the above-mentioned measure since, if the temperature is measured at the outlet especially of the last tube section of the reactor, the heat exchanger can be partially bypassed via the valve and the bypass line when a maximum temperature is exceeded. When the temperature is too high, part of the purified medium can flow off for a certain time through the line that bypasses the heat exchanger. The valve located on this branch can be actuated or regulated by the temperature sensor in such a manner that, in the heat exchanger itself, a specific desired temperature for preheating the medium is not exceeded.

In advantageous manner, this bypass regulation system can be used to heat industrial water in the second heat exchanger to a correspondingly greater degree.

In order to reach the necessary reaction temperature for the wet oxidation without difficulty when starting up the apparatus—even after a relatively long stoppage—it is advantageous for at least the reactor tube section that is located first in the direction of flow, and optionally some or all of the reactor tube sections, to have a heating means, preferably an electric heating means. For such a pre-assembled, possibly even mobile, apparatus, it is generally not possible to carry out preheating using steam or the like, since hot steam is not available at many operating sites. Electric current, however, is available virtually everywhere, so that the transportable apparatus can be started up without difficulty using such an electric heating means. For the reactor tube section(s), a resistance heating means arranged directly on its/their outer surface can be provided.

In order that such a heating process, and also an interruption of operation, can take place with minimum heat loss, it is advantageous for the reactor tube sections and/or the heat exchangers to be insulated on the outside.

Especially when several of the above-described features and measures are combined, there is obtained a compact apparatus for wet oxidation which can be pre-assembled and transported and which can be set up quickly and without difficulty at very varied operating sites, and which accordingly can make a considerable contribution to the disposal of organically contaminated liquids or slurries. From the point of view of the reaction, the reactor divided into tube sections can be regarded as a cascade of vessels with stirrers. Despite being accommodated in a very small space—preferably within the standard dimensions of a container—the necessary reaction temperature can thus be achieved with sufficiently long dwell times and correspondingly high degrees of purification. It may even be possible to increase the number of reactor tube sections subsequently, provided that there is still sufficient space available in the housing. Furthermore, variations are possible on account of the fact that the first inlet tube, for example, could be introduced into the first reactor tube section from above.

Figure 2:
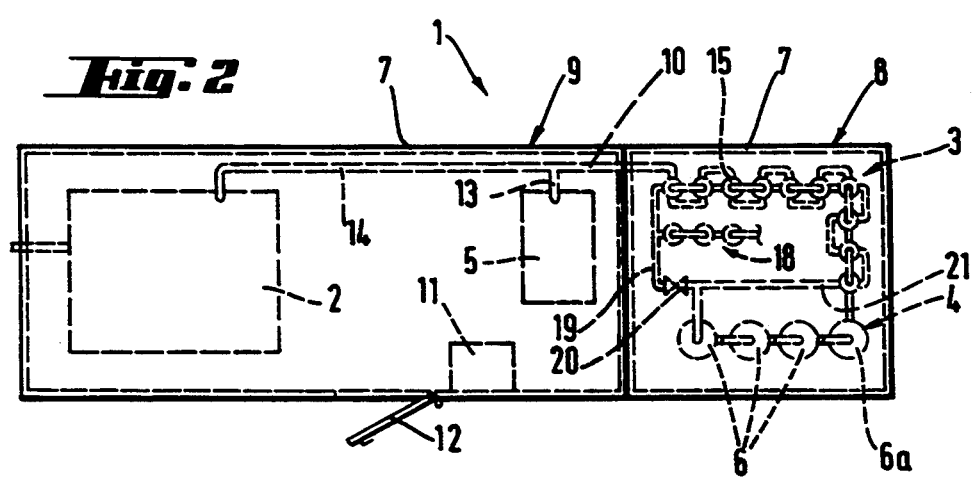
Figure 3:
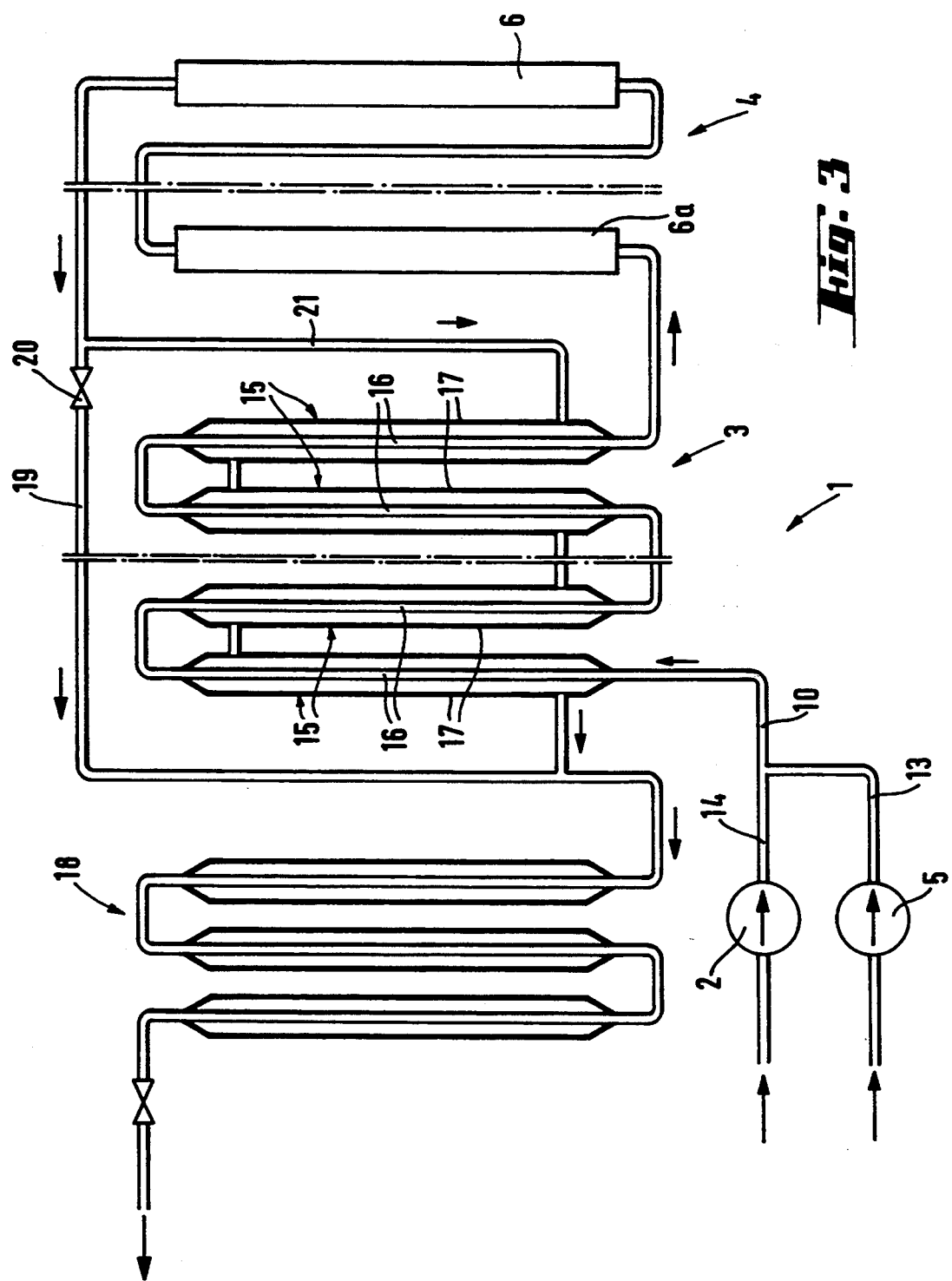

The invention, together with its associated essential details, is described in greater detail below by way of example with reference to the drawing, which shows, diagrammatically:

FIG. 1 a side view of the pre-assembled apparatus after assembly, showing the units inside two containers which have been joined together, FIG. 2 a plan view of the apparatus according to FIG. 1 with the units arranged inside, and FIG. 3 a hydraulic circuit diagram of the apparatus according to FIGS. 1 and 2.

An apparatus, indicated as a whole by reference numeral 1, is used for the wet oxidation of organically contaminated liquids and/or slurries, hereinafter also abbreviated to "medium to be purified".

According to FIG. 3, the apparatus 1 has a number of units which are connected to one another by pipelines.

In detail, there are provided as such units both in FIGS. 1 and 2 and in FIG. 3 a high-pressure pump 2 for the medium to be purified, a heat exchanger, which will be described in greater detail below and is indicated as a whole by reference numeral 3, in which unpurified medium and heated purified medium are conveyed in opposite directions, a reactor, indicated as a whole by reference numeral 4, for the actual wet oxidation, and a compressor 5 for feeding an oxygen/gas mixture, for example air, to the reactor 4.

It will further be seen that the reactor 4 is divided into individual sections 6 which are arranged next to one another and are connected hydraulically in series, and, in accordance with FIGS. 1 and 2, is pre-assembled with further units in a supporting frame, the dimensions of the supporting frame and also the overall weight being so selected that it can be transported on a road and/or rail vehicle. The supporting frame has outer walls 7, so that as a whole a housing is formed for the units contained therein, which are thus protected and sheltered.

In the embodiment, the housing formed by the supporting frame and the outer walls is a standard container 8.

In FIGS. 1 and 2 it will also be seen that two such supporting frames or containers 8 and 9 are provided for accommodating the individual units 2 to 5, and in the operating position the connecting line 10 of the units of one container 8 can be coupled to those of the other container 9. The entire apparatus 1 in the embodiment is therefore accommodated in two standard containers 8 and 9, which can each be pre-assembled and transported easily so that, at the site in which they are to be set up, the two containers 8 and 9 simply have to be joined together in the L-shape shown in FIG. I and the pipeline 10 connected in order to render the entire apparatus 1 virtually operational.

As a result of the division of the reactor 4 into several sections 6, the reactor 4 can be accommodated within the longitudinal dimensions of the container 8 despite the long length that is necessary for an adequate dwell time.

In the embodiment, the container 9 contains the pump 2, the compressor 5 and also a control and operating console 11. This is advantageous because the container 9 is a horizontal container which can easily be entered through a door 12, so that the control console 11 is readily accessible.

The other container 8 in the embodiment contains the reactor 4, divided into individual sections 6, and the heat exchanger 3.

In all three Figures it will be seen that, in the embodiment, the pressure line 13 of the compressor 5 opens into the pressure line 14 of the high-pressure pump 2, inside the container 9. As a result there is only a single coupling point for the through line 10, at the point at which it passes from the container 9 to the container 8. The two containers 8 and 9 can be connected together correspondingly rapidly on site.

In the embodiment according to FIGS. 1 and 2, the reactor is divided into four tubular sections 6 which are connected hydraulically in series and are arranged parallel to one another, so that there is plenty of room for them in the upright container 8. The necessary overall length of the reactor 4, which in total is far greater than the height of the container 8, is thus obtained without the transport dimensions of the container being exceeded.

The tube sections 6 forming the reactor 4 have identical diameters and cross-sections, which simplifies manufacture. However, in order to improve the mixing of the already hot medium with the incoming medium, it would also be possible for the tubular section 6a of the reactor 4 that is located first in the direction of flow to have a larger cross-section than the subsequent tube sections 6.

The ratio of the length of the tube sections 6 of the reactor 4 to their diameter is large and may be, for example, from ten to fifty, especially approximately forty, that is to say tube sections 6 approximately 8 m in length may have a diameter of approximately 20 cm. Such eight meter long tube sections can easily be accommodated in a container 8 having a maximum length or height of, for example, 12 m. At the same time, there is then sufficient space beneath and above the tube sections 6 for connecting lines, transition pieces and the like.

In the embodiment, the heat exchanger 3 is likewise divided into individual single-tube heat exchangers 15 which are arranged geometrically next to one another and are connected hydraulically in series, the incoming medium preferably flowing through the inner tube 16 and the purified, hot outgoing medium preferably flowing in the opposite direction through the casing 17 surrounding the inner tube. The advantageous principle of making the best possible use of space on the smallest base area of the container 8 is therefore applied also to the heat exchanger 3, while an effective transfer of heat is nevertheless achieved.

The individual single-tube heat exchangers 15 can each have an overall length that corresponds approximately to the length of the individual tube sections 6 of the reactor 4 or is only slightly greater than or slightly less than that length, so that they can be accommodated parallel to the reactor tube sections 6—as shown in FIG. 2—in the container 8 standing with its longitudinal axis upright, thereby achieving the best possible use of space.

FIG. 3 shows that downstream of the heat exchanger 3 for the medium there is arranged a second heat exchanger 18 which can be used for heating, for example, industrial water or the like and can utilise the residual heat still present downstream of the heat exchanger 3. For reasons of rationalisation and inexpensive manufacture, the heat exchanger 18 could also consist of single-tube heat exchangers, as are used in the case of the heat exchanger 3.

In order to prevent the medium to be purified from reaching too high a temperature in the heat exchanger 3 and the reaction temperature in the reactor 4 then being exceeded, provision is made according to FIG. 3 for the heat exchanger 3 to have a bypass line 19 that bypasses the heat exchanger, and for a heat sensor (not shown) to be provided in or on the reactor 4 for actuating or regulating a bypass valve 20 by means of which the feed line 21 to the heat exchanger 3 can be partly closed and, conversely, the bypass line 19 can be opened, so that part of the hot, purified medium coming from the reactor 4 can bypass the heat exchanger 3 intermittently and thus heat the incoming medium to be purified to a greater or lesser extent.

In order to be able to start up the apparatus and reach the necessary reaction temperature in the reactor 4, it is possible for at least the reactor tube section 6a that is located first in the direction of flow, and possibly for some or all of the reactor tube sections 6, to have a heating means (not shown), preferably an electric heating means. This may be a resistance heating means arranged directly on the outer surface of the tube sections 6 or 6a.

In order that the operating heat is retained for as long as possible in the event of interruptions in operation, and therefore a minimum amount of heating energy is required for starting up again, the reactor tube sections 6 and 6a, and possibly also the heat exchanger 3, are insulated on the outside. This may be achieved by separately insulating the individual units and the parts thereof, and also the pipelines, or by filling the container 8 containing the reactor tube sections 6 and 6a and the heat exchanger 3 with insulating material, for example rock wool or the like.

The apparatus 1 for wet oxidation is pre-assembled with its individual units, namely a high-pressure pump 2, a heat exchanger 3, a reactor 4 for the actual wet oxidation and a compressor 5 for feeding an oxygen/gas mixture, in one or two supporting frames and is accommodated in such a manner that its dimensions and its overall weight allow it to be transported on a road and/or rail vehicle, there advantageously being provided two such supporting frames in the form of standard containers 8 and 9, of which one may contain the reactor 4, divided into individual tube sections 6, and the heat exchanger 3, and the other may contain the remaining units, so that the entire apparatus can be pre-assembled into virtually operational condition and the two containers simply have to be set up, joined together and connected on site. Wet oxidation can thus be carried out even where relatively small amounts of medium are to be purified.

What is claimed is:

1. A transportable apparatus for the wet oxidation of an organically contaminated liquid and/or slurry employing an oxygen/gas mixture under high temperature and pressure to decompose organic impurities in the contaminated liquid or slurry, said apparatus comprising:
   a reactor in which a contaminated liquid or slurry enters, is purified by wet oxidation treatment, and exits,
   at least one high/pressure pump for conveying said contaminated liquid or slurry to the reactor for wet oxidation treatment thereof,
   at least one first heat exchanger through which said contaminated liquid or slurry is conveyed prior to introduction into said reactor in countercurrent flow to the purified liquid or slurry exiting the reactor after wet oxidation treatment such that heat is transferred from the purified liquid or slurry to the contaminated liquid or slurry,
   at least one second heat exchanger through which said purified liquid is passed and cooled to below 100° C. after its passage through said first heat exchanger, and
   a compressor for supplying an oxygen/gas mixture to said reactor,
   the improvement wherein
   said apparatus is housed in two separate elongated containers adapted for transport by road or rail vehicle, said containers including a first elongated container of a standardized size and a second elongated container of a standardized size,
   said reactor and said first heat exchanger being housed in the first elongated container and said high-pressure pump and said compressor being housed in the second elongated container,
   said reactor consisting of a plurality of elongated sections which are disposed in approximately parallel side-by-side relationship and which are connected hydraulically in series, said elongated sections being disposed within the first elongated container relatively parallel to the first elongated container, and
   wherein said first and second elongated containers are capable of being transported, independently of each other, in a horizontal position, and said first elongated container is capable of operating in a vertical position.

2. An apparatus according to claim 1 wherein said container containing the high-pressure pump also contains a control and operating console.

3. An apparatus according to claim 1 wherein the oxygen/gas mixture supplied by the compressor to the reactor is introduced into the contaminated liquid or slurry at a point before said contaminated liquid or slurry is passed through said first heat exchanger.

4. An apparatus according to claim 1, wherein said reactor consists of at least three tubular sections which are connected hydraulically in series.

5. An apparatus according to claim 4, wherein tubular sections forming said reactor have identical diameters and cross-sections.

6. An apparatus according to claim 4, wherein the tubular section of said reactor that is located first in the direction of flow has a larger cross-section than the subsequent tube sections.

7. An apparatus according to claim 4, wherein the ratio of the length of said tube sections of said reactor to their diameter is from ten to fifty so that tube sections approximately 8 m in length have a diameter of approximately 20 cm.

8. An apparatus according to claim 1, wherein said first heat exchanger is formed by a plurality of single-tube heat exchangers which are disposed parallel to one another and are connected hydraulically in series, the incoming contaminated liquid or slurry flowing through an inner tube and the purified, hot, outgoing purified liquid flowing through a casing surrounding said inner tube.

9. An apparatus according to claim 8, wherein each of said individual single-tube heat exchangers has an overall length that corresponds approximately to the length of said individual sections of said reactor or that is only slightly greater than or slightly less than that length.

10. An apparatus according to claim 1, wherein said second heat exchanger serves to heat industrial water or the like.

11. An apparatus according to claim 1, wherein said first heat exchanger has a valve-controlled bypass line for said heated purified liquid that bypasses said first heat exchanger, and there is provided in or on said reactor at least one heat sensor for actuating or regulating a valve controlling said valve-controlled bypass line.

12. An apparatus according to claim 4, wherein at least the reactor tube section that is located first in the direction of flow of the contaminated liquid or slurry has a heating means.

13. An apparatus according to claim 12, wherein there is provided for each of said reactor tube sections a resistance heating means arranged directly on their outer surface.

14. An apparatus according to claim 4, wherein said reactor tube sections are insulated on the outside.

15. An apparatus according to claim 8 wherein said single-tube heat exchangers are insulated on the outside.

* * * * *